United States Patent
Vepakomma et al.

(10) Patent No.: US 11,584,013 B2
(45) Date of Patent: Feb. 21, 2023

(54) SYSTEM, DEVICE AND METHOD FOR DETERMINING ERROR IN ROBOTIC MANIPULATOR-TO-CAMERA CALIBRATION

(71) Applicant: Wipro Limited, Bangalore (IN)

(72) Inventors: Navya Vepakomma, Bangalore (IN); Yadhunandan Ullam Subbaraya, Bangalore (IN)

(73) Assignee: Wipro Limited, Bangalore (IN)

( * ) Notice: Subject to any disclaimer, the term of this patent is extended or adjusted under 35 U.S.C. 154(b) by 352 days.

(21) Appl. No.: 16/836,427

(22) Filed: Mar. 31, 2020

(65) Prior Publication Data
US 2021/0299876 A1    Sep. 30, 2021

(30) Foreign Application Priority Data
Mar. 31, 2020  (IN) .............................. 202041014468

(51) Int. Cl.
B25J 9/16 (2006.01)
(52) U.S. Cl.
CPC ........... *B25J 9/1692* (2013.01); *B25J 9/1671* (2013.01); *B25J 9/1697* (2013.01)
(58) Field of Classification Search
None
See application file for complete search history.

(56) References Cited

U.S. PATENT DOCUMENTS

| | | | |
|---|---|---|---|
| 7,627,395 B2 | 12/2009 | Sadighi et al. | |
| 8,095,237 B2* | 1/2012 | Habibi | B25J 9/1692 318/568.13 |
| 9,517,560 B2 | 12/2016 | Amano | |
| 2013/0147944 A1* | 6/2013 | Zhang | B25J 9/1687 348/95 |
| 2014/0100694 A1 | 4/2014 | Rueckl et al. | |
| 2015/0088311 A1 | 3/2015 | Suzuki et al. | |
| 2018/0126557 A1* | 5/2018 | Gu | G05B 19/4015 |
| 2018/0194008 A1* | 7/2018 | Namiki | G06T 7/80 |
| 2019/0256300 A1* | 8/2019 | Shimamura | B25J 9/1692 |
| 2020/0271627 A1* | 8/2020 | Battenberg | B25J 9/1682 |

FOREIGN PATENT DOCUMENTS

| | | |
|---|---|---|
| CN | 102922521 A1 | 2/2013 |
| WO | 2019165561 A1 | 9/2019 |

* cited by examiner

*Primary Examiner* — Jeff A Burke
*Assistant Examiner* — Arslan Azhar
(74) *Attorney, Agent, or Firm* — Finnegan, Henderson, Farabow, Garrett & Dunner, LLP

(57) ABSTRACT

Disclosed herein is a device, system and method for determining error in robotic manipulator-to-camera calibration. The method includes detecting a test object by a camera coupled to a robotic manipulator. One or more test points are identified on the test object based on a CAD model and pre-defined contact points corresponding to the test object. Arm poses are determined for the robotic manipulator to reach the test points on the 3D test object by using current robotic manipulator-to-camera calibration. While driving an end effector of the robotic manipulator based on the arm poses, any contact of the end effector on the 3D test object is recorded upon receiving a feedback from the 3D test object. An error is determined in the current robotic manipulator-to-camera calibration based on current position of the end effector relative to the one or more test points on the 3D test object.

20 Claims, 6 Drawing Sheets

SYSTEM, DEVICE AND METHOD FOR DETERMINING ERROR IN ROBOTIC MANIPULATOR-TO-CAMERA CALIBRATION

TECHNICAL FIELD

The present subject matter is, in general, related to determining error in robotic hand to camera calibration for robotic manipulator and more particularly, but not exclusively, to a system, device, and method for determining an error in robotic manipulator-to-camera calibration.

BACKGROUND

Robotic manipulators are known as support system for industrial operations as they are configured to perform various operations in place of human operator. In advanced systems, the robotic manipulator is coupled with a camera to provide vision to the device to control the movement of robotic arm during operations. The arrangement of robotic arm and camera requires defining configuration settings for robotic manipulator for accurate task execution, more specifically, defining spatial transformations between camera coordinate system and robotic coordinate system. Such relative transformations are computed by calibrating the movement of robotic arm with respect to camera vision for any point identified in real world.

While these industrial robots are operational over time, there will be operation-induced errors associated with the robotic manipulator which effects the defined configuration between the robotic manipulator and camera resulting in inaccurate task execution. Additionally, the positions of the camera and robotic arm can get disturbed due to manual intervention or various other reasons during daily operations. Even slight changes in position of camera and robotic arm can lead to the mapping becoming incorrect and can lead to accidents if the activity is carried out by the robotic manipulator. For example, in medical field, even a minute deviation in movement of the robotic hand can lead to irreversible damages.

Therefore, it becomes necessary to determine error in the calibration so that a task can be executed correctly. Further, with advancing use of robotic manipulator, calculating limited error does not completely address the issue of deviation in movement due to incorrect mapping between robotic arm and the camera. Further, such computation has to be accurate enough to estimate accurate arm poses of the robotic arm in three-dimensional space.

Hence there is need for complete and accurate determination of error in robotic-manipulator-to-camera calibration for task execution.

The information disclosed in the background section of the disclosure is only for enhancement of understanding of the general background of the invention, and should not be taken as an acknowledgement or any form of suggestion that this information forms the prior art already known to a person skilled in the art.

SUMMARY

It is to be understood that both the foregoing general description and the following detailed description are exemplary and explanatory only and are not restrictive of the invention, as claimed.

A device for determining error in a robotic manipulator-to-camera calibration is disclosed. In one example, the device includes at least one processor and a memory coupled to the processor. The memory stores processor-executable instructions, which on execution cause the processor to detect a three-dimensional (3D) test object using at least one camera coupled to a robotic manipulator. The memory may further include instructions to cause the at least one processor to receive a Computer-Aided Design (CAD) model defining the 3D test object in an object coordinate system and one or more pre-defined contact points on the CAD model. The instructions, on execution, may further cause the at least one processor to map the one or more pre-defined contact points from the CAD model to one or more test points on the 3D test object. The memory may also include instructions to cause the at least one processor to estimate one or more arm poses for the robotic manipulator to reach the one or more test points on the 3D test object based on a current robotic manipulator-to-camera calibration. Thereafter, based on instructions stored in the memory, the processor may drive an end effector of the robotic manipulator towards the one or more test points on the 3D test object based on the one or more estimated arm poses. The instructions, on execution, may further cause the at least one processor to record contact of the end effector on the 3D test object based on a feedback from the 3D test object. Thereafter, the processor may determine, an error in at least one of a x-axis, a y-axis, a z-axis, roll, pitch or yaw in the current robotic manipulator-to-camera calibration, based on the current position of the end effector relative to the one or more test points on the 3D test object.

In one embodiment, a method of determining error in robotic manipulator-to-camera calibration is disclosed. The method may include detecting a 3D test object using at least one camera coupled to a robotic manipulator. The method may further include receiving a CAD model defining the 3D test object in an object coordinate system and one or more pre-defined contact points on the CAD model. The method may further include mapping the one or more pre-defined contact points from the CAD model to one or more test points on the 3D test object. The method may further include estimating one or more arm poses for the robotic manipulator to reach the one or more test points on the 3D test object based on a current robotic manipulator-to-camera calibration. The method may further include driving an end effector of the robotic manipulator towards the one or more test points on the 3D test object based on the one or more estimated arm poses. The method may further include recording contact of the end effector on the 3D test object based on a feedback from the 3D test object. Herein recording the contact further includes determining current position of the end effector in the object coordinate system. The method may further include determining, in the current robotic manipulator-to-camera calibration, an error in at least one of a x-axis, ay-axis, a z-axis, roll, pitch or yaw based on the current position of the end effector relative to the one or more test points on the 3D test object.

In another embodiment, a system for determining error in a robotic manipulator-to-camera calibration is disclosed. In one example, the system includes a 3D test object, at least one processor and a memory coupled with the processor. The memory stores processor-executable instructions, which on execution cause the processor to detect a 3D test object using at least one camera coupled to a robotic manipulator. The 3D test object is embedded with at least one of at least one touch sensor and at least one pressure sensor. The processor-executable instructions, on execution, may further cause the at least one processor to receive a CAD model defining the 3D test object in an object coordinate system and one or more pre-defined contact points on the CAD model. The processor-executable instructions, on execution, may further cause the at least one processor to map the one or more pre-defined contact points from the CAD model to one or more test points on the 3D test object. The processor-executable instructions, on execution, may further cause the at least one processor to estimate one or more arm poses for the robotic manipulator to reach the one or more test points on the 3D test object based on a current robotic manipulator-to-camera calibration. The processor-executable instructions, on execution, may further cause the at least one processor to drive an end effector of the robotic manipulator towards the one or more test points on the 3D test object based on the one or more estimated arm poses. The processor-executable instructions, on execution, may further cause the at least one processor to record contact of the end effector on the 3D test object based on a feedback from the 3D test object. Herein recording the contact further causes the processor to determine current position of the end effector in the object coordinate system. The processor-executable instructions, on execution, may further cause the at least one processor to determine, in the current robotic manipulator-to-camera calibration, an error in at least one of a x-axis, a y-axis, a z-axis, roll, pitch or yaw based on the current position of the end effector relative to the one or more test points on the 3D test object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

DETAILED DESCRIPTION

Figure 1:
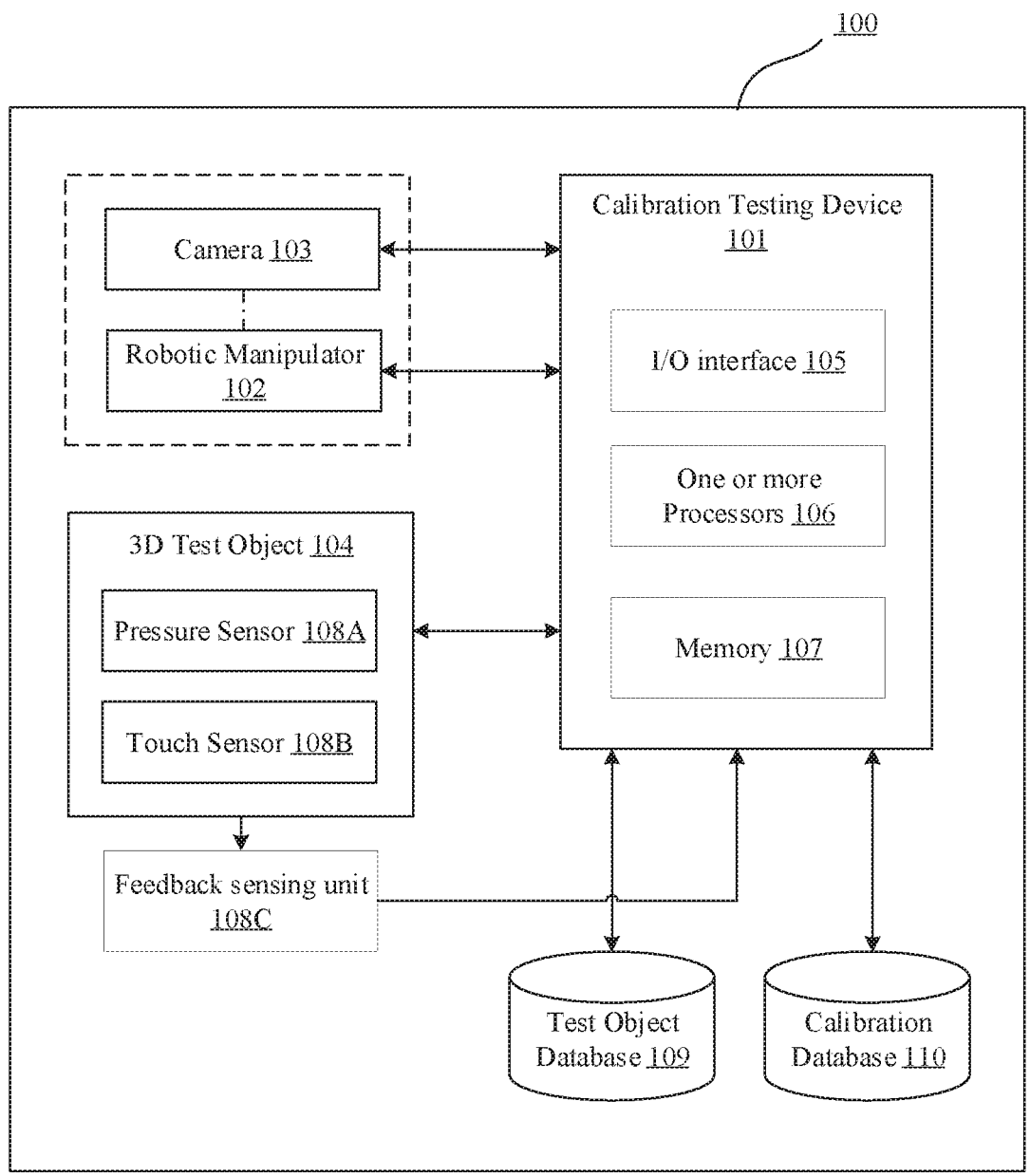
FIG. 1 illustrates an exemplary system with a calibration testing device for determining error in robotic manipulator-to-camera calibration, in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The present disclosure proposes a system, a device and a method of determining error in robotic manipulator-to-camera calibration. More specifically, the system, device and method determines translational as well as rotational error in current robotic manipulator-to-camera calibration in a robotic manipulator coupled with at least one camera. The system is configured to determine the error in the current calibration with respect to a reference object (hereinafter referred as "test object"). The test object may include a three dimensional (3D) test object, defined using an object coordinate system having origin at centroid of the 3D test object. The test object may be embedded with touch sensors and/or pressure sensors. The current robotic manipulator-to-camera calibration is pre-computed while configuring the movement of a robotic hand based on vision provided by the at least one camera coupled with robotic manipulator.

Upon detecting the 3D test object by using the at least one camera, the system identifies one or more test points on the 3D test object and estimates one or more arm poses for the robotic manipulator to reach one or more test points on the 3D object. The one or more arm poses for the robotic manipulator, determined based on the current robotic manipulator-to-camera calibration, enable the robotic manipulator to drive robotic hand to reach the one or more test points on the 3D test objects. While driving the robotic manipulator, the system also monitors any contact made by an end effector of the robotic manipulator on the 3D test object. In some embodiments, the system receives feedback from the 3D test object upon activation of any of the touch sensor or pressure sensor for any contact made by the end effector on the 3D test object. Based on the movement of the robotic manipulator and the contact made by the end effector on the 3D test object, the system determines the translational as well as rotational error in the current robotic manipulator-to-camera calibration.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary system with a calibration testing device for determining error in robotic manipulator-to-camera calibration, in accordance with some embodiments of the present disclosure. The exemplary system 100 includes a robotic manipulator 102, at least one camera 103, a 3D test object 104, and a calibration testing device 101. The exemplary system 100 may configure the robotic manipulator 102 to perform a set of testing iterations for current robotic manipulator-to-camera calibration (alternatively referred as "current calibration") using the 3D test object 104.

As will be described in greater detail in conjunction with FIG. 2 to FIG. 6, in order to determine error in the robotic manipulator-to-camera calibration, the calibration testing device 101 may first detect the 3D testing object 104 within a testing region of the robotic manipulator 104. Further, the calibration testing device 101 may receive a CAD model and reference points for the 3D test object 104 from test object database 109. The calibration testing device 101 may use the CAD model and image data from the camera 103 to determine 3D test object pose and map the reference points on the 3D test object 104 to identify test points for testing current calibration. Further, the calibration testing device 101 may estimate one or more arm poses for the robotic manipulator 102 to reach the test points on the 3D test object 104 based on the current calibration. Further, upon driving the robotic manipulator 102 towards the test points, the calibration testing device 101 may continuously monitor the movement of robotic hand in order to record any contact between the end effector and the 3D test object 104. Based on any contact made by the robotic manipulator 102 on the 3D test object 104, the calibration testing device 101 may determine the error in the current calibration, in at least one of an x-axis, a y-axis, a z-axis, roll, pitch, and yaw.

The calibration testing device 101 may include but may not be limited to, server, desktop, laptop, notebook, smartphone, and computing system. In particular, the calibration testing device 101 may include input/output devices 105, one or more processors 106, and a memory) 107. The memory 107 may store the instructions that, when executed by the processors 106, cause the one or more processors 106 to determine error in the robotic manipulator-to-camera calibration, in at least one of the x-axis, the y-axis, the z-axis, the roll, the pitch, and the yaw, in accordance with aspects of the present disclosure.

The calibration testing device 101 may be communicatively connected to a robotic manipulator 102 for monitoring the movement of robotic hand with respect to a 3D test object 104. Further, the calibration testing device 101 may be connected with the 3D test object 104 to receive positional information of the robotic hand with respect to the 3D test object 104. The calibration testing device may be connected with the 3D test object via a wired or wireless connection. The calibration testing device 101 receives the position of the robotic hand in the 3D test object space. Such positional information allows the system 100 to determine the position of the robotic hand even when the robotic hand is not visible to the camera 103 during its movement, while testing current calibration. The positional information of the robotic hand may further enable the calibration testing device 101 to determine and compute the error in the current calibration of the robotic manipulator 102.

The robotic manipulator 102 may include a movable platform such as drones, robots on a mobile base, or a static platform with a fixed setup. The robotic manipulator 102 may include a robotic hand (not shown), which is configured to perform set of operations such as lifting, gripping an object, arranging the racks, performing surveillance, and the like. The robotic hand of the robotic manipulator 102 consists of links and joints, wherein an end effector (not shown) is considered as final link. The end effector may include a single point tool or multi-finger gripper such as a three-finger gripper with fingers of uniform length. The robotic hand defines the reach of the robotic manipulator 102.

The robotic manipulator 102 may be coupled with at least one camera such as camera 103 for providing vision to the robotic hand. The camera 103 may be a normal RGB camera or a camera enabled with depth sensor. The camera 103 may be used to capture one or more image frames of the 3D test object 104. The one or more image frames captured by the camera 103 provides camera parameters, such as intrinsic parameters, distortion coefficients and the like.

The 3D test object 104 is defined in the object coordinate system, wherein the centroid of the 3D test object 104 may be considered as the origin in the object coordinate system. All the points on the surface of the 3D test object 104 should be defined in the object coordinate system. In some embodiments, the 3D test object 104 may be embedded with pressure sensors such as pressure sensor 108A and/or touch sensors such as a touch sensor 108B to provide feedback for any contact made by the robotic hand with the 3D test object 104. Further, the calibration testing device 101 may monitor a trigger via a feedback sensing unit 108C associated with the 3D test object 104, upon activation of at least one of touch sensor 108B or pressure sensor 108A in response to any contact made by the end effector on the 3D test object 104.

In some embodiments, the calibration testing device may be connected with external databases to receive test object specific details and the robotic manipulator-to-camera calibration. The calibration testing device 101 may be connected with a test object database 109 which stores the test object specific details such a Computer-Aided Design (CAD) model for the 3D test object 104, one or more pre-defined contact points or markers for the 3D test object 104, and data related to an object coordinate system associated with the 3D test object 104. The calibration testing device 101 may communicate with a calibration database 110 which stores a transformation matrix related to the robotic manipulator-to-camera calibration. The transformation matrix provides a translational and rotational mapping between the robotic coordinate system and camera coordinate system. The calibration database 110 may store the current robotic manipulator-to-camera calibration for the robotic manipulator 102. In some embodiments the memory 107 may also store various data (e.g. camera data, robotic manipulator-to-camera calibration data, transformation matrix, CAD model for test object, pre-defined contact points on the 3D test object, positional information, error data etc.) that may be captured, processed, and/or required by the calibration testing device 101 for error computation.

The calibration testing device 101 may allow a test engineer (not shown) to interact with it and provide input via input/output devices 105. The test engineer may provide instructions for performing testing of current calibration in the robotic manipulator. In some embodiments, the test engineer may define one or more reference points i.e. one or more contact points on the surface of the 3D test object 104.

For example, the test engineer may obtain CAD model of the 3D test object via I/O interface 105 accessible via a display device (not shown), and select one or more reference points for the 3D test object 104, where the robotic hand of the robotic manipulator 102 should make contact based on the current calibration. In some embodiments, the test engineer may provide instructions to the calibration testing device 102 to determine reference points based on the CAD model, configuration of the robotic hand, and configuration of the gripper. For each reference point set, the corresponding end effector configuration and/or finger positions may be stored in the memory. The system 100 may implement simulation techniques to determine the reference points such that the tip of the end effector makes proper contact with the CAD model of the 3D test object 104. In some embodiments, the calibration testing device 101 may interact with the robotic manipulator 102 and the 3D test object 104 over a communication network (not shown) for sending and receiving various data.

Figure 2:
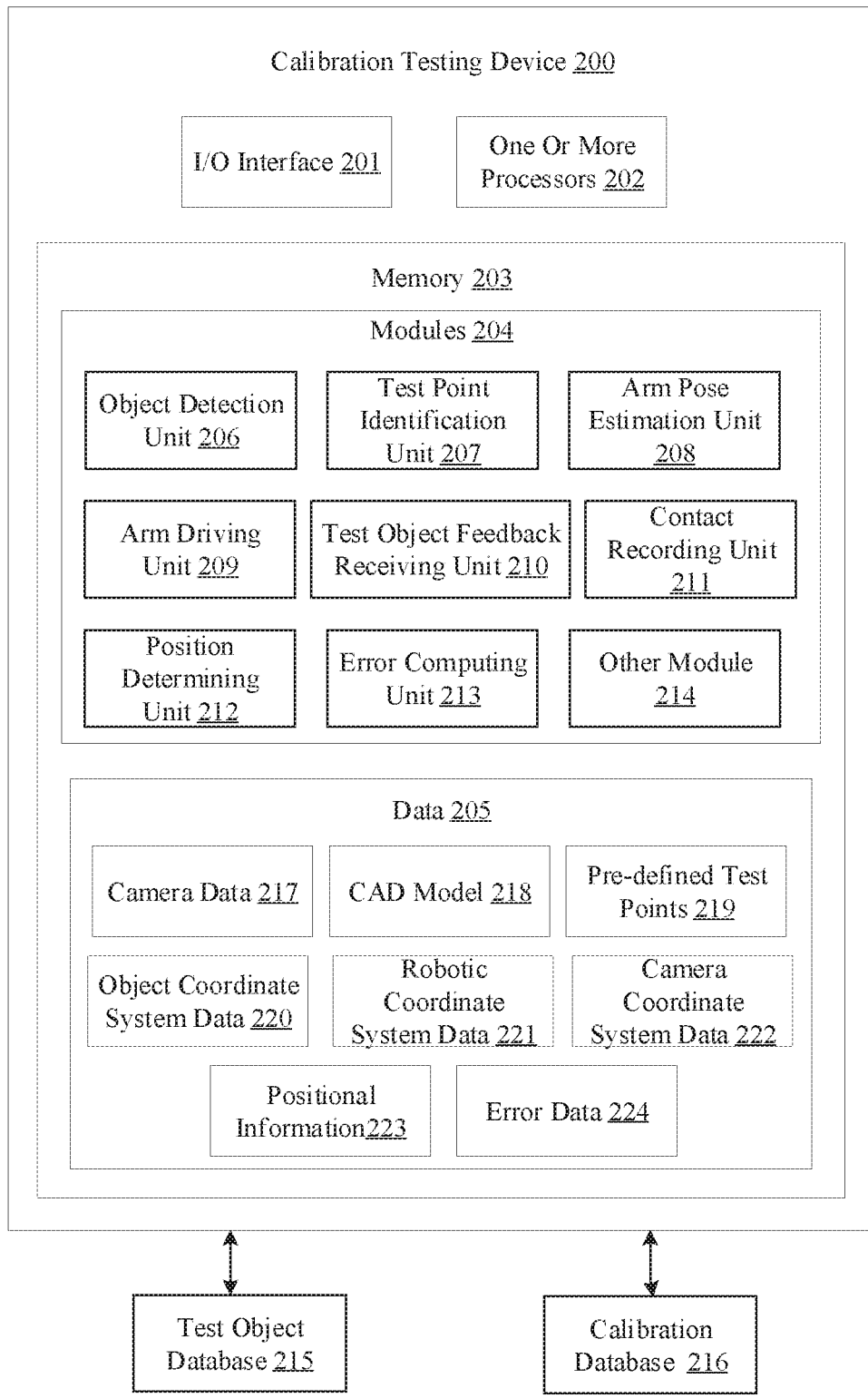
FIG. 2 illustrates a functional block diagram for a calibration testing device, in accordance with some embodiments of the present disclosure.

FIG. 2 illustrates a functional block diagram of a calibration testing device 200 (analogous to the calibration testing device 101), in accordance with some embodiments of the present disclosure. The calibration testing device 200 may include I/O interface 201, one or more processors 202 and a memory 203, for storing processor-executable instructions, when executed by the one or more processors 202 may cause the calibration testing device 200 to determine error in current robotic manipulator-to-camera calibration (alternatively referred as "current calibration"). Further the calibration testing device 200 may store data 205 and various modules 204 in the memory 203 that perform various functions so as to determine the error in current calibration. In some embodiments, the calibration testing device 200 may include an object detection unit 206, a test point identification unit 207, an arm pose estimation unit 208, an arm driving unit 209, an object feedback receiving unit 210, a contact recording unit 211, a position determining unit 212, an error computing unit 213 and other modules 214. In some embodiment, the data 205 may include camera data 217, CAD model 218, one or more pre-defined test points 219, object coordinate system data 220, robotic coordinate system data 221, camera coordinate system data 222, positional information 223, error data 224 and the like. In some embodiments, the calibration testing device 200 may be communicatively coupled with a test object database 215 which may store data associated with the 3D test object 104. The calibration testing device 200 may further communicate with a calibration database 216 which stores current calibration information of the robotic manipulator 102. In some other embodiments, the data associated with the 3D test object and/or the current calibration information of the robotic manipulator may be stored on the memory 223 of the calibration testing device 200.

The object detection unit 206 may detect the 3D test object 104 in the field of view (FOV) of the at least one camera 103 coupled with the robotic manipulator 102. In some embodiments, the robotic manipulator 102 may be coupled with plurality of cameras capturing the FOV for the robotic manipulator 102. In some embodiments, the object detection unit 206 may also verify whether the 3D test object 104 is within a testing area, or within the reach of the robotic hand of the robotic manipulator 102. The object detection unit 206 may store the one or more image frames associated with the 3D test object and may enable the calibration testing device 200 to determine a pose of the 3D test object in multi-dimension space.

The test point identification unit 207 may receive a CAD model of the 3D test object 104 from the test object database 215 to determine the shape and configuration of the 3D test object 104. The test point identification unit 207 obtains the one or more image frames from the object detection unit 206 and interlinks the CAD model with the one or more captured image frames to determine a six-dimensional (6D) pose of the 3D test object. The 6D pose of the 3D test object 104 enables the calibration testing device 101 to map one or more pre-defined contact points provided by the test engineer onto the 3D test object 104. Upon mapping the one or more pre-defined contact points based on the 6D pose of the 3D test object 104, the test point identification unit 207 identifies one or more test points on the 3D test object 104.

In particular, the one or more test points are mapped to the 3D test object 104 based on the one or more predefined contact points stored in the test object database 215. In some embodiments, the one or more pre-defined contact points may include one or more sets of contact points, for example, a set of three contact points on the 3D test object to determine translation as well as rotational error in the current calibration. Here, the one or more contact points may be defined as sets of three points. This may enable optimal configuration testing of a three finger gripper. This is explained further in conjunction with FIG. 3. In some other embodiments, the one or more test points may include one or more numbers of test points for multiple iterations of testing. For example, it can be three test points at three different positions on the 3D test object for three iterations of testing calibration.

Figure 3:
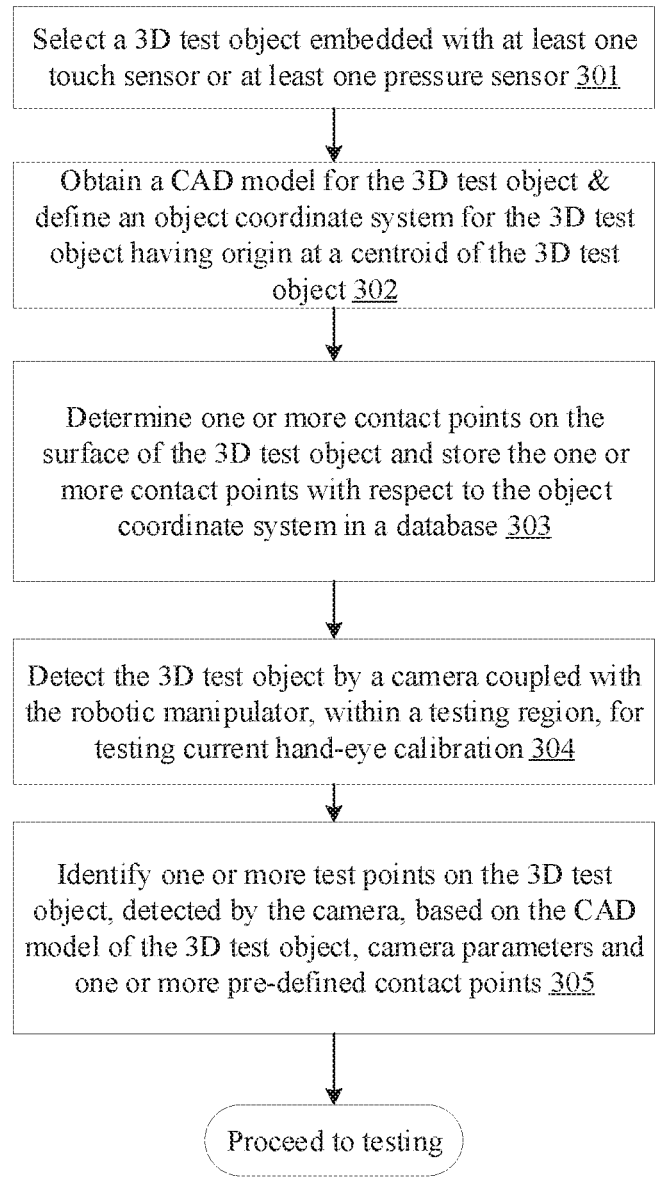
FIG. 3 illustrates a flow diagram of preparing a setup for testing current robotic manipulator-to-camera calibration in a robotic manipulator, in accordance with some embodiments of the present disclosure.

FIG. 3 illustrates a flow diagram of preparing a setup for testing current robotic manipulator-to-camera calibration in a robotic manipulator, in accordance with some embodiments of the present disclosure. At step 301, the method of preparing the setup may include selecting a 3D test object 104 for testing the current calibration for the robotic manipulator 102. The 3D test object 104 may be embedded with at least one of at least one touch sensor or at least one pressure sensor. At step 302, the method of preparing setup may include, obtaining a CAD model for the 3D test object 104. In some embodiments, the CAD model may be used to define an object coordinate system for the 3D test object having origin at centroid of the 3D test object.

Further, at step 303, the method of preparing the setup may include determining one or more contact points on the surface of the 3D test object. The one or more contact points may be determined so that a tip of the end effector, such as a single point tool and/or a multi-finger gripper, may be able to make proper and uniform contact on the surface of the 3D test object. The one or more contact points may be defined by a test engineer. In some embodiments, the one or more contact points may be determined by the calibration testing device 101, by using simulation techniques on the CAD diagram of the 3D test object, configuration of the robotic manipulator (specifically the end effector) using the current calibration. For example, in case the end effector comprises a three-finger gripper, the one or more contact points may include one or more set of three contact points that may be determined on the 3D test object so that all the three fingers should be able to make uniform contact at the one or more set of three points at the same time. It is to be noted that, the configuration of the robotic manipulator and/or spacing and geometry of the fingers while determining the one or more contact points should be saved and re-used while testing the current calibration of the robotic manipulator 102. The one or more contact points may be defined with respect to the object coordinate system and stored in a database (such as test object database 105).

Moreover, the one or more contact points may be provided based on the requirement of determining the type of error for a pre-calibrated transformation matrix with respect to the robotic manipulator 102. In some embodiments, in case of an end effector configured with a three finger gripper, the calibration testing device may receive the one or more contact points comprising a set of three points on the surface of the 3D test object 104 to determine error in at least one of the x-axis, the y-axis, the z-axis, as well as in roll, pitch, and yaw in the current calibration. In some other embodiments, the calibration testing device 101 may receive one or more single contact points for either one or multiple iterations of testing for determining only translation error in at least one of the x-axis, the y-axis, and the z-axis for the end effector comprising a single point tool. In no circumstances, the number of pre-defined contact points may restrict the determination of error for rotational components as well as translational components in the transformation matrix related to the current robotic manipulator-to-camera calibration.

At step 304, the 3D test object 104 should be detected by the camera 103 associated with the robotic manipulator 102 for testing the current calibration. The camera 103 may capture one or more image frames of the 3D test object 104. The 3D test object 104 is detected to be visible within a FOV defined by the camera 103, and to be reachable by the robotic hand of the robotic manipulator 102. In some embodiments, a testing region may be defined for the robotic manipulator 102 having static platforms. In some other embodiment, in case of mobile platforms, the robotic manipulator 102 may be moved so to detect the 3D test object 104 within the FOV and reach of the robotic manipulator 102. In addition to above, detecting the 3D test object 104 may further include determining pose of 3D test object in 6D based on mapping of the CAD model and the one or more image frames captured by the camera 103.

Further, at step 305, the setup is ready for testing upon identifying one or more test points on the 3D test object 104 based on one or more pre-defined contact points, the CAD model and camera parameters such as camera intrinsic parameters, distortion coefficients etc. In some embodiments, the position of the one or more test points are identified in camera coordinate system. Once the 3D test object 104 and the one or more test points are identified by the robotic manipulator 102, a calibration testing device may determine error in the current calibration, which will be explained below in conjunction with FIG. 5.

Referring back to FIG. 2, the arm pose estimation unit 208 may receive the one or more test points for the 3D test object 104 in the camera coordinate system. The one or more test points (more specifically target position) on the 3D test object 104 may be transformed from the camera coordinate system into the robotic coordinate system based on the current calibration, which will be explained further in conjunction with FIG. 4. The arm pose estimation unit 208, may detect the position and orientation of the one or more test points on the 3D test object and computes the position and orientation to which the robotic hand is to move based on the current calibration, so that the tip of the end effector appropriately touches the one or more test points at accurate position and along with correct orientation. Upon determining target position of the one or more test points in the robotic coordinate system, the arm pose estimation unit 208 determines one or more arm poses required for the robotic manipulator 102 to reach the test points on the 3D test object 104. The one or more arm poses include synchronous movement of the link and joints of the robotic hand to one or more calculated position of the robotic hand, wherein the end effector comprises final link of the robotic hand.

The arm driving unit 209 may drive the robotic hand and the end effector towards the one or more test points on the 3D test object 104 based on the one or more estimated arm poses. The movement of the robotic hand may be powered using one or more motors responsible for the movement of each joint. In some embodiment, the arm driving unit 209 may use motion sensors to optimize the movement of the robotic hand.

Further, the test object feedback receiving unit 210 may receive the feedback from the 3D test object 104 for any contact made by the end effector on the surface of the 3D test object 104. The test object feedback receiving unit 210 may triggers the robotic manipulator 102 to stop the movement of the robotic hand.

The contact recording unit 211 may obtain contact data from the 3D test object 104. Such contact data may include the positional information 223 of one or more contact points for the contact made by the end effector on the 3D test object. The contact data, may be used by the position determining unit 212, in order to determine current position of the end effector with respect to the 3D test object 104 and/or one more test points on the 3D test object 104. The contact data may include the positional information of the contact made by the end effector at the test points, or at any other points on the 3D test object 104.

Thus, the error computing unit 213 may determine deviation in the movement of the robotic hand vis-á-vis the one or more test points on the 3D test object 104, where the movement of the robotic hand is guided based on the one or more estimated arm poses calculated using the current calibration. The error computing unit 213 determines the error in the current calibration in at least one of the x-axis, the y-axis, the z-axis, the roll, the pitch, and the yaw for the robotic manipulator. The error computing unit 213 may determine the deviation in the contact points where the end effector makes inaccurate contact on the 3D test object based on the one or more estimated arm poses. In some embodiments, the error computing unit 213 may determine the absence of contact by the end effector after the completion of the one or more estimated arm poses. In such cases, the transformation between the current position of the robotic hand with respect to the one or more test points is determined, in order to determine the current position of the end effector with respect to the 3D test object 104 in the object coordinate system.

It should be noted that the calibration testing device 200 may be implemented in programmable hardware devices such as programmable gate arrays, programmable array logic, programmable logic devices, or the like. Alternatively, the calibration testing device 101 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices. For example, the calibration database 216 need not to be connected as an external database, the data stored in the calibration database may be stored in the memory associated with the calibration testing device 200. Similarly, the test object database 215 need not to placed separately or remotely, it can be a part of the calibration testing device 200, or alternatively, the CAD model and the one or more pre-defined contact points may be directly received and/or stored in the memory of the calibration testing device 200.

As will be appreciated by one skilled in the art, a variety of processes may be employed for determining error and/or inaccuracy in calibration for the robotic manipulator. For example, the calibration testing device 200 may perform error computation by the processes discussed herein. In particular, as will be appreciated by those of ordinary skill in the art, control logic and/or automated routines for performing the techniques and steps described herein may be implemented by the calibration testing device 200, either by hardware, software, or combinations of hardware and software. For example, suitable code may be accessed and executed by the one or more processors on the calibration testing device 200 to perform some or all of the techniques described herein. Similarly, application specific integrated circuits (ASICs) configured to perform some or all of the processes described herein may be included in the one or more processors on the calibration testing device 200.

Figure 4:
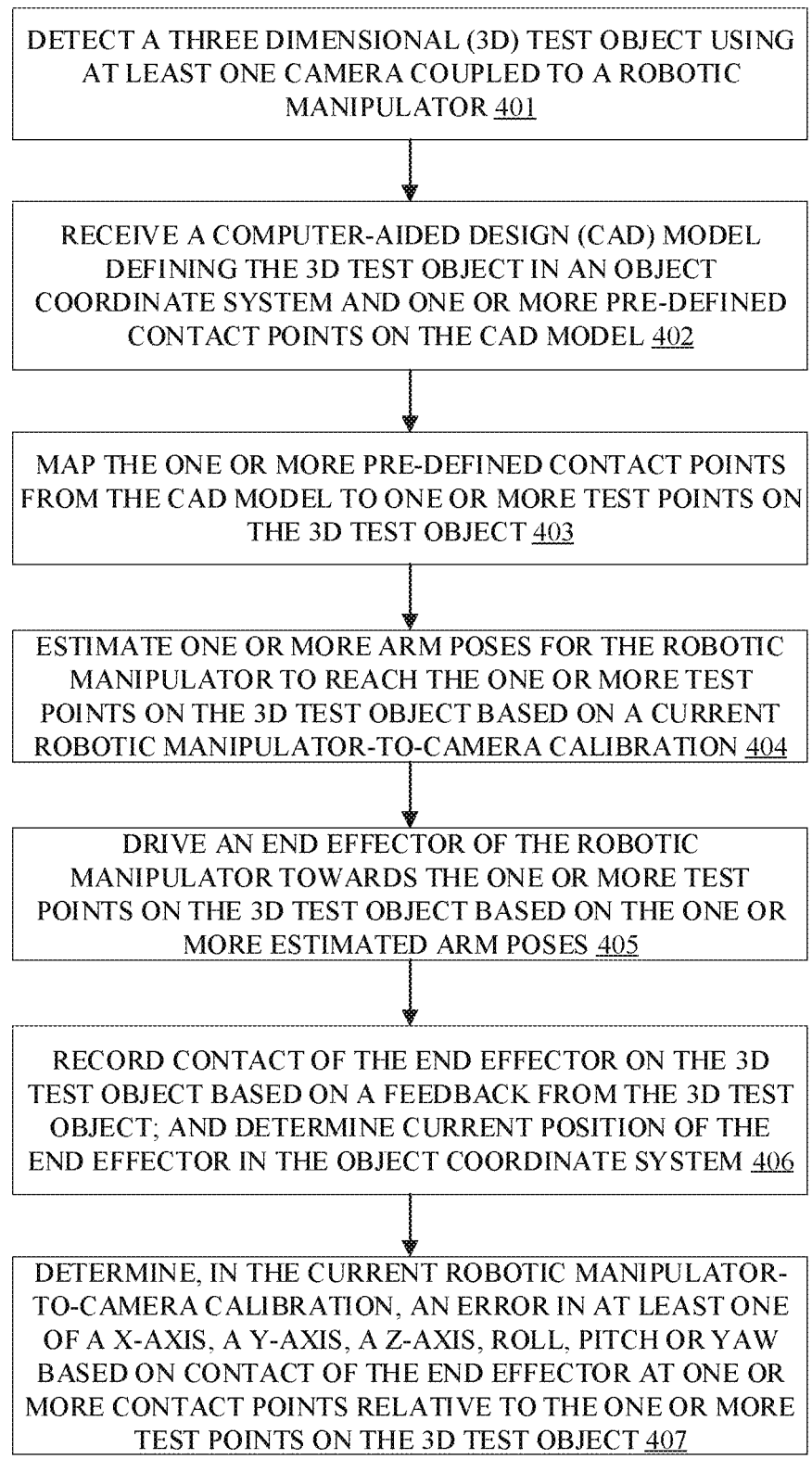
FIG. 4 illustrates a flow diagram of a detailed exemplary process for determining error in robotic manipulator-to-camera calibration, in accordance with some embodiments of the present disclosure.

For example, referring now to FIG. 4, exemplary process for determining error in robotic manipulator-to-camera calibration, is depicted via a flow diagram, in accordance with some embodiments of the present disclosure. As illustrated in the flowchart, at step 401, a 3D test object 104 is detected by at least one camera 103 coupled to a robotic manipulator 102. The 3D test object 104 is embedded with at least one of at least one touch sensor 108B and at least one pressure sensor 108A to provide immediate feedback for any contact made on the 3D test object 104. The at least one camera 103 detect the visibility within the FOV of the at least one camera 103, and the position of the 3D test object 104 within the reach of the robotic hand of the robotic manipulator 102. It should be noted that, a testing region may be predefined for a robotic manipulator 102 for testing calibration. In some embodiments, in case of a static robotic manipulator, if the 3D test object is outside the FOV and/or the reach of the robotic hand, the 3D test object may be manually brought within the testing region. In some other embodiment, for a movable robotic manipulator, the robotic manipulator 102 may be moved towards or around the 3D test object 104 in order to bring the 3D test object 104 within the FOV and/or the reach of the robotic manipulator 102.

At step 402, the calibration testing device 101 receives the CAD model of the 3D test object 104 and one or more predefined points on the 3D test object 104. As mentioned above, the 3D test object 104 is defined in an object coordinate system, wherein the centroid of the 3D test object 104 may be considered as an origin of the object coordinate system. All the points on the surface of the 3D test object 104 are to be defined with respect to the object coordinate system. Further the CAD model of the 3D test object 104 is already available to the calibration testing device 101 and a test engineer. In some embodiments, the CAD model may be used to define the object coordinate system for the 3D test object 104.

The one or more pre-defined contact points may be determined in advance and stored in the test object database 105. In some embodiments, the one or more pre-defined contact points may include one or more set of reference points on the surface of the 3D test object 104 where a multi-fingers gripper can make uniform contact at the same time. Further, the test engineer may define the one or more pre-defined points in advance where the fingers of the end effector tool can make uniform contact at the same time on the 3D test object 104. In some embodiments, the calibration testing device 101 may define one or more reference points for the 3D test object 104 based on the CAD model of the 3D test object 104 and the configuration of the end effector tool for testing the current calibration.

At step 403, the one or more predefined contact points may be mapped from the CAD model into one or more test points on the 3D test object 104. The CAD model of the 3D test object 104 provides exact configuration of the 3D test object 104. In some embodiments, the calibration testing device 101 may determine 6D pose of the 3D test object 104 by mapping the CAD model with the one or more image frames captured by the at least one camera 103. According to the pose of the 3D test object 104 in six dimension, the one or more pre-defined contact points received by the calibration testing device 101 may be mapped into the one or more test points on the surface of the 3D test object 104. The one or more test points are identified on the 3D test object 104 to test the current robotic manipulator-to-camera calibration in the robotic manipulator 102.

At step 404, one or more arm poses for the robotic manipulator 102 may be estimated to reach the one or more test points on the 3D test object 104 based on a current robotic manipulator-to-camera calibration. The one or more arm poses for the robotic manipulator 102 may be estimated based on the position coordinates of the one or more test objects identified in the camera coordinate system by at least one camera 103. In some embodiments, the calibration testing device 101 may use camera parameters such as intrinsic parameters, distortion coefficients to estimate the one or more arm poses for the robotic manipulator 102. Further the current robotic manipulator-to-camera calibration may be pre-computed and stored in the form of a transformation matrix in the calibration database 106. The transformation matrix defines a translational and rotational mapping between the camera coordinate system and a robotic coordinate system. The pre-calibrated transformation matrix includes rotational and translational components, such as:

$$M = \begin{bmatrix} \overline{a_{11} \quad a_{12} \quad a_{13}} & \overline{a_{14}} \\ a_{21} \quad a_{22} \quad a_{23} & a_{24} \\ a_{31} \quad a_{32} \quad a_{33} & a_{34} \end{bmatrix} \quad (1)$$
$$\text{Rotation matrix} \quad \text{Translation matrix}$$

The one or more arm poses may be estimated based on the pre-computed transformation matrix. In some embodiments, the calibration testing device 101 may consider the shape and configuration of the end effector to while estimating the one or more estimated arm poses for the robotic manipulator 102. In some embodiments, the end effector may include single point tool or multi-finger gripper. The one or more test points may be identified based on the configuration of the end effector of the robotic manipulator 102 for testing current calibration. For example, where the end effector comprises three-finger gripper, the one or more test points may be identified as a set of three points, which may allow the calibration testing device to determine error in both rotation as well as translation components. In case of the end effector with single point tool, the one or more test points may include one or more single points to determine translation error in the calibration.

In an embodiment of multi-finger gripper, the one or more arm poses may be estimated by multiplying the transformation matrix with the positional coordinates of the one or more test points identified for the 3D test object 104. The one or more estimated arm poses calculated for the end effector and the robotic manipulator 102 may be denoted as PcalculatedRobot: (xCRi,yCRi,zCRi).

At step 405, the end effector of the robotic manipulator 102 is driven towards the one or more test points on the 3D test object 104 based on the one or more estimated arm poses. The robotic hand may be moved slowly towards the one or more test points on the 3D test object 104.

In some embodiments, where the one or more test points comprises one or more set of test points, the end effector may be driven based on the one or more estimated arm poses so as to make contact at one or more points out of one or more set of test points identified on the 3D test object 104. For example, in case of three-finger gripper, the robotic hand may be moved in such a way that the three fingers of the end effector make contact with the 3D test object 104 at a set of three points identified on the 3D test object 104. In some embodiments, the three fingers may not accurately make contact on the 3D test object 104, such as only one or two fingers of the three-finger gripper may make accurate contact at the at least one or two points of a set of test points identified on the 3D test object 104. It is to be noted that, the one or more set of points may also include multiple sets of test points for driving the robotic hand at multiple iterations for testing the current calibration. In some other embodiments, where the end effector may be a single point tool, the end effector may be driven to the one or more test points at multiple iterations on the 3D test object 104 for testing the current calibration.

Moreover, at step 406, the calibration testing device 101 may record the contact of the end effector on the 3D test object 104. In some embodiments, the record of the contact may be based on a feedback received from the 3D test object 104 upon activation of the at least one of the at least one touch sensor 108B or the at least one pressure sensor 108A in the 3D test object 104. The contact may or may not be at a target position of the one or more test points in the 3D test object 104. It should be noted that the target position of the one or more test points on the 3D test object is mapped based on the one or more contact points pre-defined in the object coordinate system of the 3D test object, as explained above. In some embodiments, the end effector may make accurate contact at the target position of the one or more test points, upon completion of the one or more estimated arm poses, computed based on the transformation matrix (such as matrix M (1)). Furthermore, recording the contact may include determining current position of the end effector in the object coordinate system, as will be explained below in greater detail with the help of FIG. 5.

Figure 5:
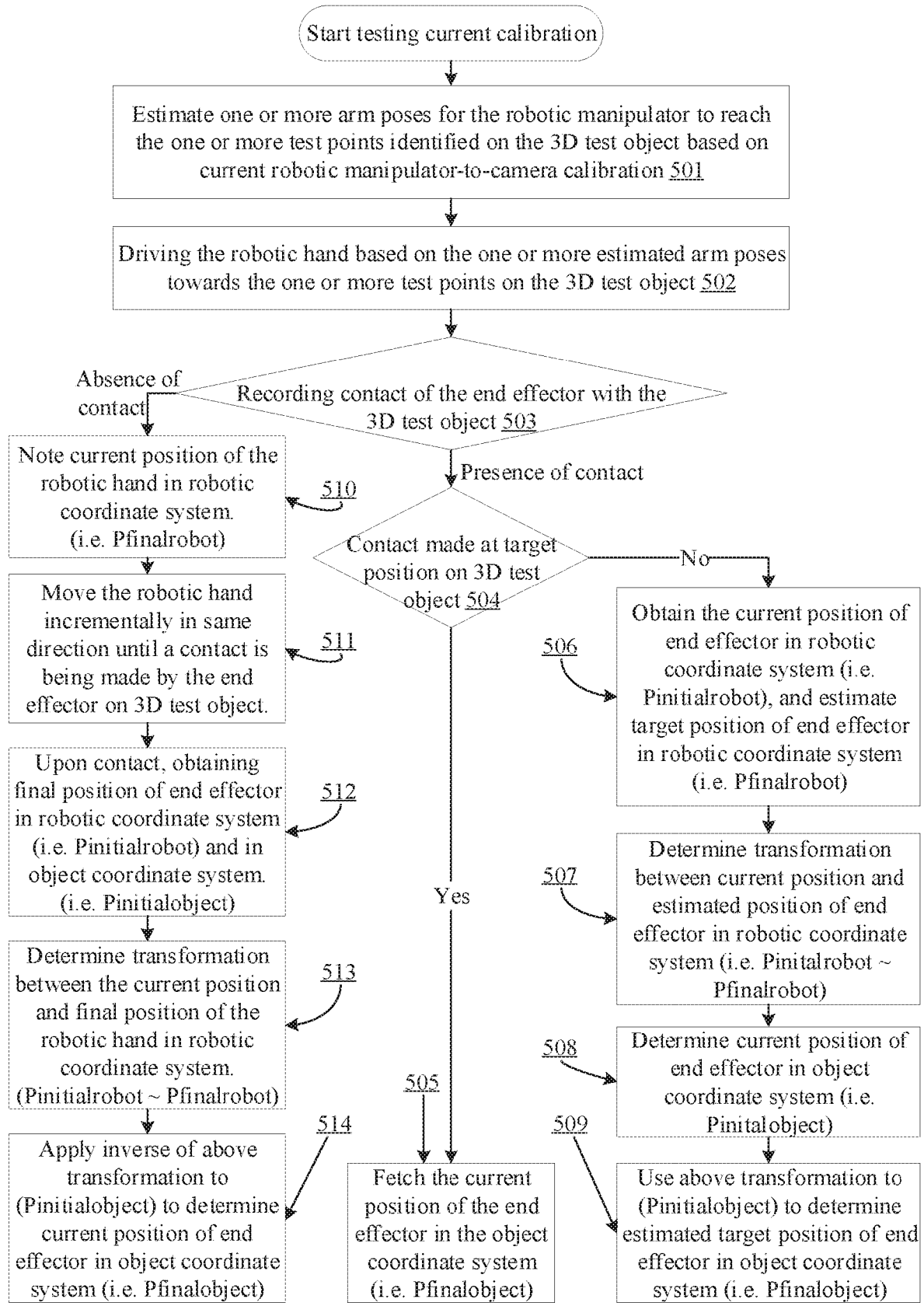
FIG. 5 illustrates flow chart of an exemplary process of testing robotic manipulator-to-camera calibration for a robotic manipulator, in accordance with some embodiments of the present disclosure.

FIG. 5 illustrates flow chart of an exemplary process of testing robotic manipulator-to-camera calibration for a robotic manipulator 102, in accordance with some embodiments of the present disclosure. As mentioned above, the robotic manipulator-to-camera calibration may be pre-computed and stored in the form of a transformation matrix. At step 501, the one or more estimated arm poses may be determined based on the current calibration. At step 502, the robotic hand and the end effector is driven towards the one or more test points on the 3D test object 104 based on the one or more estimated arm poses. Further, at step 503, the calibration testing device 101 may record a contact of the end effector with the 3D test object 104.

Based on the contact of the end effector with the 3D test object 104, the calibration testing device 101 may determine the current position of the end effector in the object coordinate system, as explained below. In some embodiments, the recording of contact, at step 503, between the end effector and the 3D test object 104 may be at one or more points other than the one or more test points on the 3D test object 104. In some embodiments, the recording of contact may be upon completion or prior to the completion of the one or more estimated arm poses. Further, the calibration testing device 101 may be configured to receive an emergency trigger from the 3D test object 104, upon activation of the at least one of the at least one touch sensor 108B or at least one pressure sensor 108A, while the robotic hand is in-between its movement based on the one or more estimated arm poses.

At step 504, the calibration testing device 101 may verify whether the contact has been made at target position on the 3D test object or not. Upon verifying that the contact has been made at the one or more test points, the calibration testing device 101 may fetch the target position of the one or more test points in the object coordinate system, at step 505. Herein, in case of accurate contact, the target position of the one or more test points in the object coordinate system will be same as the current position of the end effector in the object coordinate system. In case of a multi-finger gripper, such as a three-finger gripper, the accurate contact may be contact by the three fingers at each of three corresponding points in the one or more set of test points at the same time in an iteration. In case, the end effector does not make contact at each of the three points, but only one or two points, on the 3D test object 104, the contact is said to inaccurate contact, which is not made at the target position on the 3D test object 104. In such a case, below mentioned steps 506-509 will be followed to determine the current position of each of the three fingers of the end effector in the object coordinate system. Moreover, the calibration testing device 101 may be configured to detect an absence of the contact by the end effector in the 3D test object 104, after the completion of the one or more estimated arm poses by the robotic manipulator 102. Such contact may also considered as inaccurate contact, as it does not reach the desired position on the 3D test object 104. In such a case, below mentioned steps 510-514 will be followed to determine the current position of each of the three fingers of the end effector in the object coordinate system.

In some embodiments, when the end effector touch the 3D test object 104 at points other than the test points identified on the 3D test object 104, the calibration testing device 101 may obtain the current position of the end effector in the robotic coordinate system in order to determine the current position of the end effector in the object coordinate system. At step 506, the current position (Pinitialrobot: $xI^R_i$, $yI^R_i$, $zI^R N$) of the end effector is also obtained in the robotic coordinate system. Further, the target position (Pfinalrobot: $xF^R_i$, $yF^R_i$, $zF^R_i$) of the end effector (i.e. estimated final arm pose of the end effector) is obtained in the robotic coordinate system. Further At step 507, a transformation between the current position and the estimated position of the end effector (i.e. TrPiPf: Pinitialrobot~Pfinalrobot) may be determined in the robotic coordinate system. At step 508, a current position (Pinitialobject: $xI^O_i$ $yI^O_i$, $zI^O_i$) of the one or more contact points (other than the one or more test points) on the 3D test object 104 in the object coordinate system may be determined based on the CAD model from the test object database 105. At step 509, the above-calculated transformation (TrPiPf) may be applied to the target position (Pinitialobject: $xI^O i$, $yI^O i$, $zI^O i$) of the one or more test points in order to determine the current position of the end effector in the object coordinate system (i.e. Pfinalobject: $xF^O i$, $yF^O i$, $zF^O i$). Such current position may help in determining deviation in the current position and the target position of the end effector from the 3D test object space.

Upon detecting the absence, at step 510, the calibration testing device 101 may be further configured to determine the current position of the end effector in the object coordinate system, as explained below. At step 510, the current position of the end effector in the robotic coordinate system is obtained. The current position of the end effector, after the completion of the one or more estimated arm poses, may be a final pose of the robotic manipulator 102 (Pfinalrobot: $xF^R i$, $yF^R i$, $zF^R i$). At step, 511, the robotic hand and the end effector is incrementally moved along in the same direction in at least one of the x-axis, the y-axis, and the z-axis until a contact is being made by the end effector on the 3D test object 104. Further, a contact may be recorded, upon receiving a feedback for contact by the 3D test object 104, upon activation of the at least one of the at least one touch sensor 108B or the at least one pressure sensor 108A embedded in the 3D test object 104. Upon contact, at step 512, final position of the end effector may be obtained in the robotic coordinate system (Pinitialrobot: $xI^R i$, $yI^R i$, $zI^R i$) and the object coordinate system (Pinitialobject: $xI^O i$, $yI^O i$, $zI^O i$). At step 513, a transformation between the current position and the final position of the end effector (i.e. TrPfPi: Pinitialrobot~Pfinalrobot) may be determined in the robotic coordinate system. Further, at step 514, an inverse of the above-calculated transformation (TrPfPi) may be applied to the final position (Pinitialobject: $xI^O i$, $yI^O i$, $zI^O i$) of the end effector in the object coordinate system in order to determine the current position of the end effector in the object coordinate system (Pfinalobject: $xF^O i$, $yF^O i$, $zF^O i$).

It is to be noted that the above-mentioned steps determining the current position of the end effector, need not to be sequential, and may be followed randomly based on the detection of presence or absence of contact between the end effector and the 3D test object 104.

Referring back to FIG. 4, at step 407, upon determining the current position of the end effector in the object coordinate system, an error in the current robotic-manipulator-to-camera calibration may be determined by the error computing unit 213, based on the current position of the end effector with respect to the one or more test points on the 3D test object 104. The error may be determined in at least one of an x-axis, a y-axis, a z-axis, roll, pitch and yaw in the current calibration.

Further, determining the error in the current robotic manipulator-to-camera calibration further includes computing affine transformation between the current position of the end effector and target position the one or more test points on the 3D test object 104 defined in the object coordinate system, as explained below in FIG. 6.

Figure 6:
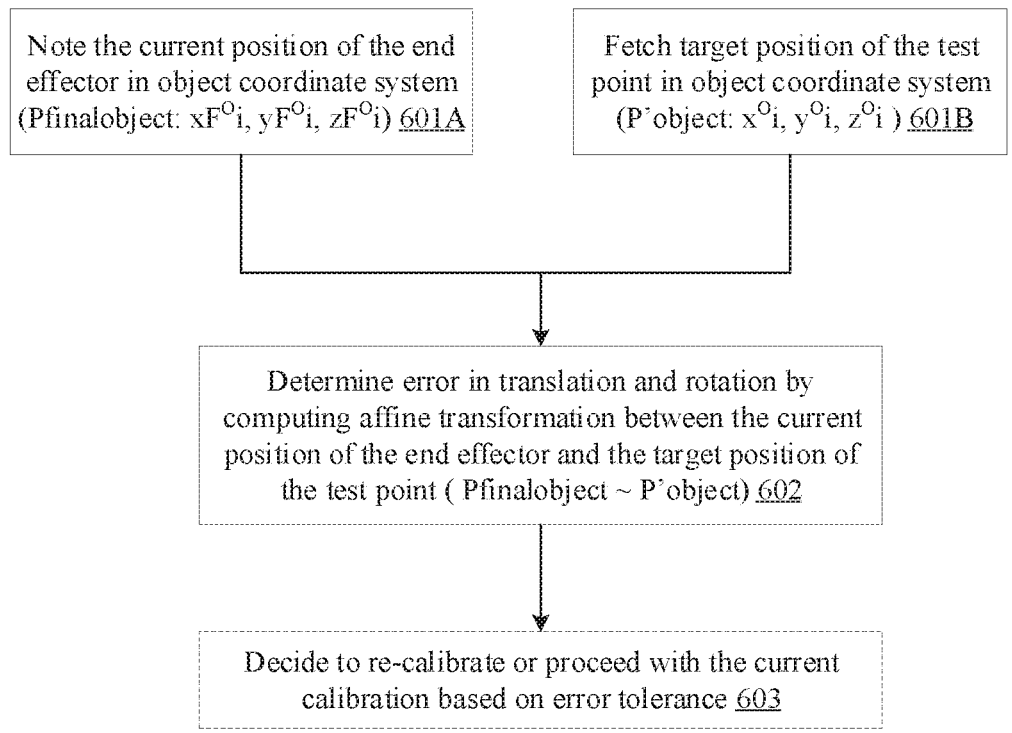
FIG. 6 illustrates the flow chart of computation of error in robotic manipulator-to-camera calibration for a robotic manipulator, in accordance with some embodiments of the present disclosure; and It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes, which may be substantially represented in computer readable medium and executed by a computer or processor, whether such computer or processor is explicitly shown.

FIG. 6 illustrates the flow chart of computation of error in robotic manipulator-to-camera calibration for a robotic manipulator 102, in accordance with some embodiments of the present disclosure. The error computing unit 213 may obtain the current position of the end effector (i.e. Pfinalobject: $xF^O i$, $yF^O i$, $zF^O i$) determined on the object coordinate system, at step 601A. Further, at step 601B, the error computing unit 213 may fetch the one or more test points (i.e. P'object: $x^O i$, $y^O i$, $z^O i$) which is defined as one or more contact points for the 3D test object 104 in the object coordinate system, from the test object database 105. Further, at step 602, the error in the current calibration may be determined based on affine transformation between the current position of the end effector and target position of the one or more test points on the 3D test object 104. The affine transformation may be computed between the current position of the end effector and target position the one or more test points (i.e. Pfinalobject~P'object), which may define the rotational as well as translational error in the transformation matrix. The current position of the end effector and target position the one or more test points on the 3D test object 104 may be defined in the object coordinate system.

In some embodiments, once the overall error is computed in the current calibration, the calibration testing device 101 may define the error tolerance, at step 603, based on the application of the robotic manipulator 102. Depending upon the computed error, the error tolerance, the calibration testing device 101 may further provide decision as to re-calibrate the robotic manipulator 102 or to continue industrial operations based on the current robotic manipulator-to-camera calibration for the robotic manipulator 102.

Advantages of the embodiments of the present disclosure are illustrated herein.

In an embodiment, the method of present disclosure helps in determining error in pre-computed calibration of a robotic manipulator to identify any operation-induced error. It allows quick and precise determination of translation as well as rotational error in current robotic manipulator-to-camera calibration.

In an embodiment, the method of present disclosure may be used for accurate computation of error in calibration, without making any harm or distortion to a working object.

In an embodiment, the method of present disclosure significantly reduces any accidents and errors caused due to erroneous calibration. Further the measured error may be used to modify values of current calibration to generate corrected calibration for robotic devices.

The terms "an embodiment", "embodiment", "embodiments", "the embodiment", "the embodiments". "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A device for determining error in a pre-computed robotic manipulator-to-camera calibration, the device comprising;
   at least one processor;
   a memory coupled with the processor, storing processor-executable instructions, which on execution causing the processor to:
   detect a three-dimensional (3D) test object using at least one camera coupled to a robotic manipulator, wherein the 3D test object is embedded with at least one touch sensor and at least one pressure sensor;
   receive a Computer-Aided Design (CAD) model defining the 3D test object in an object coordinate system and one or more pre-defined contact points on the CAD model;
   map the one or more pre-defined contact points from the CAD model to one or more test points on the 3D test object, wherein the one or more test points are identified on the 3D test object to test the pre-computed robotic manipulator-to-camera calibration of the robotic manipulator, and
   wherein the pre-computed robotic manipulator-to-camera calibration defines a desired position/orientation to which the robotic manipulator is to move while performing a task that comprises one of: lifting the 3D test object, gripping the 3D test object, arranging the 3D test object on racks, and performing surveillance of the 3D test object;
   estimate one or more arm poses for the robotic manipulator to reach the one or more test points on the 3D test object based on the pre-computed robotic manipulator-to-camera calibration;
   drive an end effector of the robotic manipulator towards the one or more test points on the 3D test object based on the one or more estimated arm poses, wherein the end effector of the robotic manipulator comprises a multi-finger gripper;
   record contact of the multi-finger gripper of the end effector at one or more points other than the one or more test points on the 3D test object based on a feedback from the 3D test object, while testing the pre-computed robotic manipulator-to-camera calibration,
   wherein the feedback is received from the 3D test object upon activation of the touch sensor and pressure sensor for the contact of multi-finger gripper at the one or more points other than the one or more test points on the 3D test object; and
   wherein recording the contact comprises determining current position of the end effector that has not reached at least one of the one or more test points in the object coordinate system;
   determine in the pre-computed robotic manipulator-to-camera calibration, an error that comprises:
   rotational error and/or translational error in at least one of a x-axis, ay-axis, a z-axis, roll, pitch or yaw based on the recorded contact of the multi-finger gripper of the end effector on the 3D test object and the current position
   of the end effector relative to the one or more test points on the 3D test object; and
   based on the detected error, re-calibrating the pre-computed robotic manipulator-to-camera calibration so as to guide the multi-finger gripper of the end effector towards corresponding points in the one or more test points, while performing the task on the 3D test object.

2. The device of claim 1, wherein the one or more arm poses are estimated based on a transformation matrix, wherein the transformation matrix comprises a translational and rotational mapping between a camera coordinate system and a robotic coordinate system.

3. The device of claim 1, wherein determining the error in the pre-computed robotic manipulator-to-camera calibration further comprises computing affine transformation between the current position of the end effector and target position of the one or more test points on the 3D test object.

4. The device of claim 1, wherein recording the contact further comprises recording the contact of the multi-finger gripper of the end effector at the one or more points other than the one or more test points on the 3D test object, prior to completion of the one or more estimated arm poses by the robotic manipulator.

5. The device of claim 4, wherein upon detecting the contact of the multi-finger gripper by the end effector at the one or more points other than the one or more test points, further causes the processor to determine the error by determining transformation between current position of the end effector and estimated position of the end effector based on the one or more arm poses, in the robotic coordinate system, and determining the current position of the end effector in the object coordinate system based on the transformation.

6. The device of claim 1, wherein determining the error in the pre-computed robotic manipulator-to-camera calibration further comprises determining an absence of contact of at least one gripper among the multi-finger gripper of the end effector on the 3D test object, after the completion of the one or more estimated arm poses by the robotic manipulator.

7. The device of claim 6, upon determining the absence of contact of the end effector on the 3D test object, further cause the processor to incrementally drive the end effector of the robotic manipulator in at least one of the x-axis, y-axis or z-axis from current position to make a contact with the 3D test object, determine a transformation between the current position of the end effector and final position of the end effector, in the robotic coordinate system, and determine the current position of the end effector in the object coordinate system based on the transformation.

8. A method for determining error in a pre-computed robotic manipulator-to-camera calibration, the method comprising:
   detecting, by a calibration testing system, a three-dimensional (3D) test object using at least one camera coupled to a robotic manipulator, wherein the 3D test object is embedded with at least one touch sensor and at least one pressure sensor;

receiving, by the calibration testing system, a Computer-Aided Design (CAD) model defining the 3D test object in an object coordinate system and one or more pre-defined contact points on the CAD model;

mapping, by the calibration testing system, the one or more pre-defined contact points from the CAD model to one or more test points on the 3D test object, wherein the one or more test points are identified on the 3D test object to test the pre-computed robotic manipulator-to-camera calibration in the robotic manipulator, and wherein the pre-computed robotic manipulator-to-camera calibration defines a desired position/orientation to which the robotic manipulator is to move while performing a task that comprises one of: lifting the 3D test object, gripping the 3D test object, arranging the 3D test object on racks, and performing surveillance of the 3D test object;

estimating, by the calibration testing system, one or more arm poses for the robotic manipulator to reach the one or more test points on the 3D test object based on the pre-computed robotic manipulator-to-camera calibration;

driving, by the calibration testing system, an end effector of the robotic manipulator towards the one or more test points on the 3D test object based on the one or more estimated arm poses, wherein the end effector of the robotic manipulator comprises multi-finger gripper;

recording, by the calibration testing system, contact of the multi-finger gripper of the end effector at one or more points other than the one or more test points on the 3D test object based on a feedback from the 3D test object, while testing the pre-computed robotic manipulator-to-camera calibration, wherein the feedback is received from the 3D test object upon activation of the touch sensor and pressure sensor for the contact of multi-finger gripper at the one or more points other than the one or more test points on the 3D test object; and wherein recording the contact comprises determining current position of the end effector that has not reached at least one of the one or more test points in the object coordinate system; and determining, by the calibration testing system, in the pre-computed robotic manipulator-to-camera calibration, an error that comprise: rotational error and/or translational error in at least one of a x-axis, ay-axis, a z-axis, roll, pitch or yaw based on the recorded contact of the multi-finger gripper of the end effector on the 3D test object and the current position of the end effector relative to the one or more test points on the 3D test object; and based on the detected error, re-calibrating the robotic manipulator-to-camera calibration so as to guide the multi-finger gripper of the end effector towards corresponding points in the one or more test points, while performing the task on the 3D test object.

9. The method of claim 8, wherein the one or more arm poses are estimated based on a transformation matrix, wherein the transformation matrix comprises a translational and rotational mapping between a camera coordinate system and a robotic coordinate system.

10. The method of claim 8, wherein determining the error in the pre-computed robotic manipulator-to-camera calibration further comprises computing affine transformation between the current position of the end effector and target position the one or more test points on the 3D test object.

11. The method of claim 8, wherein recording the contact further comprises recording the contact of the multi-finger gripper of the end effector at the one or more points other than the one or more test points on the 3D test object, prior to completion of the one or more estimated arm poses by the robotic manipulator.

12. The method of claim 11, further comprising, upon detecting the contact of the multi-finger gripper by the end effector at the one or more points other than the one or more test points, determining the error by determining transformation between current position of the end effector and estimated position of the end effector based on the one or more arm poses, in the robotic coordinate system, and determining the current position of the end effector in the object coordinate system based on the transformation.

13. The method of claim 8, wherein determining the error in the pre-computed robotic manipulator-to-camera calibration further comprises determining an absence of contact of at least one gripper among the multi-finger gripper of the end effector on the 3D test object, after the completion of the one or more estimated arm poses by the robotic manipulator.

14. The method of claim 13, further comprising, upon determining the absence of contact of the end effector on the 3D test object, incrementally driving the end effector of the robotic manipulator in at least one of the x-axis, y-axis or z-axis from current pose to make a contact with the 3D test object, determining a transformation between the current position of the end effector and final position of the end effector, in the robotic coordinate system, and determining the current position of the end effector in the object coordinate system based on the transformation.

15. A system for determining error in a pre-computed robotic manipulator-to-camera calibration, the system comprising;

a three-dimensional (3D) test object, embedded with at least one of at least one touch sensor and at least one pressure sensor;

at least one processor;

a memory coupled with the processor, storing processor-executable instructions, which on execution causing the processor to:

detect the 3D test object using at least one camera coupled to a robotic manipulator, wherein the 3D test object is embedded with at least one touch sensor and at least one pressure sensor;

receive a Computer-Aided Design (CAD) model defining the 3D test object in an object coordinate system and one or more pre-defined contact points on the CAD model;

map the one or more pre-defined contact points from the CAD model to one or more test points on the 3D test object, wherein the one or more test points are identified on the 3D test object to test the pre-computed robotic manipulator-to-camera calibration in the robotic manipulator, and wherein the pre-computed robotic manipulator-to-camera calibration defines a desired position/orientation to which the robotic manipulator is to move while performing a task that comprises one of:

lifting the 3D test object, gripping the 3D test object, arranging the 3D test object on racks, and performing surveillance of the 3D test object;

estimate one or more arm poses for the robotic manipulator to reach the one or more test points on the 3D test object based on the pre-computed robotic manipulator-to-camera calibration;

drive an end effector of the robotic manipulator towards the one or more test points on the 3D test object based on the one or more estimated arm poses, wherein the end effector of the robotic manipulator comprises multi-finger gripper;

record contact of the multi-finger gripper of the end effector at one or more points other than the one or more test points on the 3D test object based on a feedback from the 3D test object, while testing the pre-computed robotic manipulator-to-camera calibration, wherein the feedback is received from the 3D test object upon activation of the touch sensor and pressure sensor for the contact of multi-finger gripper at the one or more points other than the one or more test points on the 3D test object; and wherein recording the contact comprises determining current position of the end effector that has not reached at least one of the one or more test points in the object coordinate system; and determine in the current robotic manipulator-to-camera calibration, an error that comprise:

rotational error and/or translational error in at least one of an x-axis, a y-axis, a z-axis, roll, pitch or yaw based on the recorded contact of the multi-finger gripper of the end effector on the 3D test object and the current position of the end effector relative to the one or more test points on the 3D test object; and based on the detected error, re-calibrating the current robotic manipulator-to-camera calibration so as to guide the multi-finger gripper of the end effector towards corresponding points in the one or more test points, while performing the task on the 3D test object.

16. The system of claim 15, wherein the one or more arm poses are estimated based on a transformation matrix, wherein the transformation matrix comprises a translational and rotational mapping between a camera coordinate system and a robotic coordinate system.

17. The system of claim 15, wherein determining the error in the pre-computed robotic manipulator-to-camera calibration further comprises computing affine transformation between the current position of the end effector and target position of the one or more test points on the 3D test object.

18. The system of claim 15, wherein recording the contact further comprises recording the contact of the multi-finger gripper of the end effector at the one or more points other than the one or more test points on the 3D test object, prior to completion of the one or more estimated arm poses by the robotic manipulator.

19. The system of claim 18, wherein upon detecting the contact of the multi-finger gripper by the end effector at the one or more points other than the one or more test points, further causes the processor to determine the error by determining transformation between current position of the end effector and estimated position of the end effector based on the one or more arm poses, in the robotic coordinate system, and determining the current position of the end effector in the object coordinate system based on the transformation.

20. The system of claim 15, wherein determining the error in the pre-computed robotic manipulator-to-camera calibration further comprises determining an absence of contact of at least one gripper among the multi-finger gripper of the end effector on the 3D test object, after the completion of the one or more estimated arm poses by the robotic manipulator.

* * * * *